(12) United States Patent
Fleischhaker et al.

(10) Patent No.: US 8,734,949 B2
(45) Date of Patent: May 27, 2014

(54) METHOD FOR PASSIVATING METALLIC SURFACES USING CARBOXYLATE-CONTAINING COPOLYMERS

(75) Inventors: Friederike Fleischhaker, Ludwigshafen (DE); Christian Schade, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/569,481

(22) Filed: Aug. 8, 2012

(65) Prior Publication Data

US 2013/0209813 A1    Aug. 15, 2013

Related U.S. Application Data

(60) Provisional application No. 61/521,782, filed on Aug. 10, 2011.

(51) Int. Cl.
*C23C 22/53*    (2006.01)
*C09D 5/08*    (2006.01)
*B05D 7/14*    (2006.01)

(52) U.S. Cl.
USPC ........................ 428/411.1; 427/409

(58) Field of Classification Search
USPC ............... 427/407.1, 409; 428/411.1
See application file for complete search history.

(56) References Cited

U.S. PATENT DOCUMENTS

| | | | |
|---|---|---|---|
| 4,384,902 A | 5/1983 | Crotty et al. | |
| 4,421,789 A | 12/1983 | Kaneko et al. | |
| 5,658,649 A | 8/1997 | Wrobleski et al. | |
| 2007/0082193 A1* | 4/2007 | Dietsche et al. | 428/336 |

FOREIGN PATENT DOCUMENTS

| | | |
|---|---|---|
| DE | 195 16 765 A1 | 11/1996 |
| DE | 197 54 108 A1 | 6/1999 |
| WO | WO 97/23513 | 7/1997 |
| WO | WO 2004/074372 A1 | 9/2004 |
| WO | WO 2005/042801 A1 | 5/2005 |
| WO | WO 2006/021309 A1 | 3/2006 |

OTHER PUBLICATIONS

International Search Report issued Oct. 31, 2012, in PCT/EP2012/065452.

* cited by examiner

*Primary Examiner* — William Phillip Fletcher, III
(74) *Attorney, Agent, or Firm* — Oblon, Spivak, McClelland, Maier & Neustadt, L.L.P.

(57) ABSTRACT

A method for passivating metallic surfaces, more particularly those of strip metals, by treating the surface in alternating layers with
  a) an acidic, aqueous preparation comprising at least one water-soluble copolymer (A) containing acid groups and
  b) an aqueous preparation comprising at least one water-soluble and/or water-dispersible species (B) which contains cationic and/or procationic groups, preferably a cationic and/or procationic polymer (B1),
the preparation a) always being the first and the last layer.

14 Claims, No Drawings

METHOD FOR PASSIVATING METALLIC SURFACES USING CARBOXYLATE-CONTAINING COPOLYMERS

The present invention relates to a method for passivating metallic surfaces by treating the surface with an acidic, aqueous preparation of a carboxylate-containing copolymer. The invention further relates to passivating layers and metallic surfaces obtainable by means of the method.

The raw material presently used for the production of sheetlike metallic workpieces such as, for example, casings of household appliances (white goods), instrument casings, facade claddings, ceiling claddings or window profiles, automotive components, bodywork components, comprises typically long metal strips which are produced by hot rolling and/or cold rolling of metal blocks (known as slabs) and which are wound into coils for the purposes of storage and transportation.

The metal strips are divided up and are shaped to form the desired parts by means of suitable techniques such as punching, drilling, folding, conversion into profiles and/or deep drawings. Larger components, such as automobile bodies, for example, are optionally assembled from a plurality of individual parts by welding.

The corrosion protection treatment of metallic materials of this kind is typically accomplished in multistage operations, and the surface of treated metals carries a plurality of different layers. A corrosion protection treatment can be performed at various points in the production operation. The corrosion protection involved may be either temporary or permanent. Temporary protection is applied, for example, only for storage or transportation of a metal strip or other metallic workpiece, and is removed again prior to the ultimate processing.

Protecting metallic components against corrosion is of great economic importance. Of particular importance both technically and economically is the corrosion protection treatment, in particular, of aluminum surfaces, and also of the surfaces of zinc-coated metals, more particularly of electrogalvanized or hot-dip-galvanized iron and steel. The corrosion protection afforded by the zinc derives from the fact that it is baser than the metallic material itself, and therefore, to start with, undergoes corrosion itself. The metallic material itself remains intact as long as it is still covered continuously with zinc.

In the presence of atmospheric oxygen, a thin oxide layer forms initially on the surface of Zn or Zn alloys, Al or Al alloys, and this layer slows the corrosive attack on the underlying metal to a greater or lesser degree depending on the external conditions.

In order to boost the protective effect of such an oxide layer, Al and Zn surfaces are generally subjected to an additional passivating treatment. In the course of such treatment, a fraction of the metal/metal oxide to be protected is usually dissolved in the form of metal ions, which are incorporated into the applied passivating layer. This film is similar to the oxide film which is present in any case, but it provides more robust protection. It is typically referred to as a passivating layer. In many cases it also enhances the adhesion of coating layers applied to the metal. Instead of the term "passivating layer", therefore, the term "conversion coat" is often used synonymously, and sometimes even the term "pretreatment layer". Passivating layers are comparatively thin, with a typical thickness of not more than 3 µm.

In order to reinforce the corrosion protection it is common to apply additional (coating) layers to the passivating layer. Such applications usually involve a combination of two or more coating layers, each serving different purposes. They serve to protect the passivating layer and the metal from corrosive gases and/or liquids, but also from mechanical damage, such as stone chipping, and they also, of course, serve esthetic purposes. Coating layers are typically much thicker than passivating layers. Customary thicknesses range from 2 µm to 400 µm.

The passivation may be used for permanent corrosion protection or else only for temporary corrosion protection. Temporary protection is used only for storing or transporting a metal panel or other metallic workpiece, and is removed again prior to the ultimate processing.

Passivating layers on zinc or aluminum surfaces have hitherto been obtained customarily by treating the workpiece requiring protection with aqueous, acidic solutions of $CrO_3$. The mechanism of such passivation is complex. It includes the dissolution of metallic Zn or Al from the surface, and its reprecipitation in the form of amorphous zinc-chromium oxides or aluminum-chromium oxides, respectively. The layers may, however, also comprise extraneous ions and/or further components from the treatment solution. In the case of treatment with chromic acid in particular it is impossible to rule out the incorporation into the passivating layer of a certain fraction of Cr(VI).

In order to avoid treatment with carcinogenic Cr(VI) solutions, proposals have been made to carry out treatment of the metallic surfaces with acidic, aqueous Cr(III) solutions. As an example, reference may be made to U.S. Pat. No. 4,384,902. Increasingly, however, there are customers on the market who desire entirely chromium-free processes for passivation. In order to avoid the use of Cr(VI) and Cr(III), therefore, the use of polymers is gaining increasingly in importance. DE-A 195 16 765 discloses a chromium-free and fluoride-free process for producing conversion coats on metallic surfaces of Zn or Al. The acidic solution used for passivation comprises a water-soluble polymer, phosphoric acid, and Al chelate complexes. As an option it is also possible to use polymers and copolymers of (meth)acrylic acid.

DE-A 197 54 108 discloses a chromium-free aqueous corrosion protection composition which, however, comprises toxic hexafluoro anions of Ti(IV) and/or Zr(IV), vanadium ions, cobalt ions, and phosphoric acid. Optionally, furthermore, various film-forming polymers may be added as well, including carboxyl-containing copolymers such as acrylic acid/maleic acid copolymers.

WO 2004/074372 A1 relates to an aqueous acidic preparation comprising copolymers of 50% to 99.9% by weight of (meth)acrylic acid, 0.1% to 50% by weight of acidic comonomers, such as, for example, ethylenically unsaturated dicarboxylic acids, and/or polymerizable phosphoric and/or phosphonic acids, and to the use thereof in a method for passivating metal surfaces. The metal surface is treated by a spraying, rolling or dipping process. The passivating layer obtainable can be recoated with one or more coating layers.

WO 2006/021309 A1 discloses a method for passivating metallic surfaces using an acidic aqueous preparation comprising itaconic acid homopolymers or copolymers. The itaconic acid polymers are prepared at a polymerization temperature of less than 120° C., producing better corrosion protection in relation to acrylic acid-maleic acid copolymers. The method may also comprise a continuous method for treating strip metals. The passivating layer obtainable may constitute a temporary or permanent protection against corrosion, and may be recoated with one or more coating layers.

The above-described chromium-free methods are still in need of improvement with respect to the corrosion protection, but also from a process engineering standpoint as well, particularly in the case of the coil-coating of strip metals.

The zinc-coating and passivating of metal strips ("coils") of this kind is undertaken industrially on continuous lines. The metal strip is first galvanized by passing it through a galvanizing apparatus, such as a trough containing molten zinc, for example, and subsequently through a further device for passivation—for example, likewise a trough, a rinsing apparatus or a coater. As a general rule, further steps in the method are performed continuously as well, examples being cleaning or rinsing steps or else the application of a first coating layer to the passivating layer. Typical speeds at which metal strips are run through the continuous lines are 50 to 150 m/min. This means that the contact time between metallic surface and the preparation used for passivating is only short. For the treatment there are typically only a few seconds available. An industrially suitable method must therefore feature only short contact times but nevertheless sufficient results.

It is an object of the invention, therefore, to provide an improved method, which is preferably free of heavy metals, more particularly of chromium, and is preferably fluorine-free, without using organic solvents and/or toxic ingredients, for passivating metallic surfaces of Zn, Zn alloys, Al or Al alloys, said method affording improved corrosion protection in relation to the prior art, and with which a satisfactory result nevertheless requires only short contact times between the metallic surface and the preparation used for passivating. The method ought in particular to be able to be carried out continuously as well, particularly for the passivation and/or pretreatment of strip metals.

Found accordingly has been a method for passivating metallic surfaces, in which the surface is treated in alternating layers with
   a) an acidic, aqueous preparation comprising at least one copolymer (A) synthesized from (a1)) (meth)acrylic acid or salts thereof and (a2) at least one further monoethylenically unsaturated monomer, which is different from (a1)) and contains acidic groups, and
   b) an aqueous preparation comprising at least one water-soluble and/or water-dispersible species which contains cationic and/or procationic groups (B), where a) is always applied as the first and last layer.

The invention provides a method for passivating a metallic surface, which comprises treating the surface in alternating layers with
   a) an acidic, aqueous preparation comprising at least one water-soluble copolymer (A) synthesized from
      (a1)) 15% to 99.9% by weight of (meth)acrylic acid or salts thereof and
      (a2) 0.1% to 85% by weight of at least one further monoethylenically unsaturated monomer, which is different from (a1)) and contains acidic groups, and also, optionally, (a3) 0% to 55% by weight of at least one further ethylenically unsaturated monomer, which is different from (a1)) and (a2); and
   b) an aqueous preparation comprising at least one water-soluble and/or water-dispersible species (B) which contains cationic and/or procationic groups, preferably at least one water-soluble cationic and/or procationic polymer (B1);
   a) always being the first and last layer.

Surprisingly it has been found that the method described results in significantly improved corrosion protection, particularly in respect of strip metals.

Details of the invention now follow:

The term "water-soluble" in the sense of this invention is intended to denote that the copolymers (A) and cationic and/or procationic species (B) used are to be preferably homogeneously water-soluble.

The copolymers (A) and cationic and/or procationic species (B) used ought preferably to be infinitely miscible with water, although this is not absolutely necessary in every case. They must, however, be water-soluble at least to an extent such that passivation by means of the method of the invention is possible. As a general rule, the copolymers (A) and cationic and/or procationic species (B) used ought to have a solubility of at least 50 g/l, preferably 100 g/l.

Furthermore, the method of the invention also encompasses the use of aqueous dispersions of the species (B).

The skilled person in the polymers art is aware that the solubility not only of (anionic) polymers containing acid groups but also of cationic and/or procationic species in water may be dependent on pH. As a reference point, therefore, the pH value selected is that desired in each case for the particular end use. A polymer which at a particular pH does not have sufficient solubility for the intended end use may have a sufficient solubility at a different pH.

For the copolymer (A) used in accordance with the invention it is possible as monomer (a1)) to use acrylic acid and/or methacrylic acid or mixtures thereof, with acrylic acid being preferred.

The amount of (meth)acrylic acid (a1)) in the copolymer (A) is preferably 20% to 90%, more preferably 30% to 70%, and very preferably 35% to 65%, by weight, this figure being based on the sum of all the monomers in the polymer.

The acidic groups of the at least one monoethylenically unsaturated monomer (a2) are preferably selected from the group consisting of carboxyl groups, sulfonic acid groups, phosphoric and/or phosphonic acid groups. With particular preference they are carboxyl groups, phosphoric and/or phosphonic acid groups. It is of course also possible for two or more different monomers (a2) to be used.

Examples of monomers of this kind include crotonic acid, vinylacetic acid, $C_1$-$C_4$ monoesters of monoethylenically unsaturated dicarboxylic acids, styrenesulfonic acid, vinylsulfonic acid, acrylamidopropanesulfonic acid, vinylphosphonic acid, monovinyl phosphate, maleic acid, fumaric acid or itaconic acid.

The amount of the monomers (a2) in the copolymer (A) is preferably 10% to 70%, more preferably 20% to 65%, and very preferably 30% to 60%, by weight, based in each case on the sum of all the monomers in the polymer.

The monomers (a2) are preferably monoethylenically unsaturated dicarboxylic acids having 4 to 7 carbon atoms (a21) and/or monoethylenically unsaturated phosphoric and/or phosphonic acids (a22).

Examples of monomers (a21) include maleic acid, fumaric acid, methylfumaric acid, methylmaleic acid, dimethylmaleic acid, methylenemalonic acid or itaconic acid. The monomers may optionally also be used in the form of the corresponding cyclic anhydrides. Preference is given to maleic acid or maleic anhydride, fumaric acid, and itaconic acid, particular preference to itaconic acid.

The copolymer (A) is preferably synthesized from monomer units of acrylic acid (a1) and itaconic acid (a21).

Examples of monomers (a22) include vinylphosphonic acid, monovinyl phosphate, allylphosphonic acid, monoallyl phosphate, 3-butenylphosphonic acid, mono-3-butenyl phosphate, mono(4-vinyloxybutyl)phosphate, phosphonoxyethyl acrylate, phosphonoxyethyl methacrylate, mono(-2-hydroxy-3-vinyloxypropyl)phosphate, mono(1-phosphonoxymethyl-2-vinyloxyethyl)phosphate, mono(3-allyloxy-2- hydroxypropyl)phosphate, mono-2-(allyloxy-1-phosphonoxymethylethyl)phosphate, 2-hydroxy-4-vinyloxymethyl-1,3,2-dioxaphosphole, 2-hydroxy-4-allyloxymethyl-1,3,2-dioxaphosphole, 2-methacrylamidoethylphosphoric acid. Monomers in question are preferably vinylphosphonic acid, monovinyl phosphate or allylphosphonic acid, more preferably vinylphosphonic acid.

Besides the monomers (a1)) and (a2) it is possible optionally to use 0% to 55% by weight of at least one further ethylenically unsaturated monomer (a3), which is different from (a1) and (a2). Over and above this, no other monomers are employed.

The monomers (a3) serve to fine-tune the properties of the copolymer (A). It is of course also possible for two or more different monomers (a3) to be used. They are selected by the skilled person in accordance with the desired properties of the copolymer and with the proviso, furthermore, that they must be copolymerizable comonomers (a1) and (a2).

Preferably, as for (a1) and (a2), they are monoethylenically unsaturated monomers. In special cases, however, small amounts of monomers having two or more polymerizable groups may also be used. As a result of this it is possible for the copolymer to be crosslinked to a small extent.

Examples of suitable monomers (a3) include, in particular, alkyl esters or hydroxyalkyl esters of (meth)acrylic acid, such as methyl(meth)acrylate, ethyl(meth)acrylate, butyl(meth)acrylate, 2-ethylhexyl(meth)acrylate, hydroxyethyl(meth)acrylate, hydroxypropyl(meth)acrylate or butane-1,4-diol monoacrylate. Further suitable are vinyl or allyl ethers such as, for example, methyl vinyl ether, ethyl vinyl ether, propyl vinyl ether, 2-ethylhexyl vinyl ether, vinyl cyclohexyl ether, vinyl-4-hydroxybutyl ether, decyl vinyl ether, 2-(diethylamino)ethyl vinyl ether, 2-(di-n-butylamino)ethyl vinyl ether or methyldiglycol vinyl ether, and the corresponding allyl compounds. Use may likewise be made of vinyl esters such as vinyl acetate or vinyl propionate, for example. Also possible is the use of basic comonomers, such as acrylamide, for example, and alkyl-substituted or hydroxyalkyl-substituted acrylamides. Alkoxylated monomers may be used as well, more particularly ethoxylated monomers. Especially suitable are alkoxylated monomers which derive from acrylic acid or methacrylic acid.

Examples of crosslinking monomers include molecules having two or more ethylenically unsaturated groups, examples being di(meth)acrylates such as ethylene glycol di(meth)acrylate or butane-1,4-diol di(meth)acrylate or poly(meth)acrylates such as trimethylolpropane tri(meth)acrylate or else di(meth)acrylates of oligoalkylene or polyalkylene glycols, such as di-, tri- or tetraethylene glycol di(meth)acrylate. Other examples include vinyl(meth)acrylate, allyl(meth)acrylate, divinylethyleneurea or butanediol divinyl ether. Likewise suitable are diallyl and oligoallyl ethers of polyhydroxy compounds, such as pentaerythritol triallyl or tetraallyl ether, for example.

The amount of all monomers (a3) used, together, is 0% to 55% by weight, based on the total amount of the monomers used. The amount is preferably 0% to 30% by weight, more preferably 0% to 20%. If crosslinking monomers (a3) are present, the amount thereof ought in general not to exceed 5%, preferably 2% by weight, based on the total amount of all the monomers used for the method. The amount may be, for example, 10 ppm to 1% by weight.

With particular preference the copolymer (A) comprises, in addition to (a1), at least one monomer (a21) and at least one monomer (a22). Also with particular preference, besides the monomers (a1), (a21), and (a22), there are no further monomers (a3) present.

Preferred for the implementation of the present invention are copolymers A formed from monomers (a1), (a21), and (a22), the amount (a1)) being 30% to 50% by weight, the amount of (a21) being 20% to 50% by weight, the amount of (a22) being 1% to 30% by weight, and the amount of (a3) being 0% to 20% by weight. In the case of (a21) and (a22), the monomers in question may in each case be just one monomer (a21) and one monomer (a22), or else there may be two or more different monomers (a21) and (a22).

With particular preference, the amount of (a1)) is 40% to 50% by weight, the amount of (a21) 35% to 45% by weight, the amount of (a22) 5% to 25% by weight, and the amount of (a3) 0% to 10% by weight.

With very particular preference the copolymer (A) is composed of monomer units of acrylic acid (a1), itaconic acid (a21), and vinylphosphonic acid (a22) in the amounts stated above.

The components (a1), (a2), and optionally (a3) may be polymerized with one another in a manner which is known in principle. Corresponding polymerization techniques are known to the skilled person. The copolymers (A) are preferably prepared by radical polymerization of the aforementioned components in aqueous solution. In addition there may also be small amounts of water-miscible organic solvents present, and also, optionally, small amounts of emulsifiers. Details of the conduct of a radical polymerization are known to the skilled person and are described in publications including WO 2004/074372 A1 and WO 2006/021309 A1, hereby incorporated by reference.

The synthesized copolymers (A) may be isolated from the aqueous solution by means of customary methods known to the skilled person, as for example by evaporation of the solution, spray drying, freeze drying or precipitation. After the polymerization, however, the copolymers (A) are preferably not isolated from the aqueous solution at all; instead, the polymer solution obtained is used as it is.

The molecular weight $M_w$ (weight average) of the copolymers (A) used for the method of the invention is specified by the skilled person in accordance with the desired application. It is possible to use, for example, copolymers (A) having a molecular weight $M_w$ of 3000 to 2 000 000 g/mol. Copolymers which have been found appropriate are, in particular, those having a molecular weight of 5000 g/mol to 500 000 g/mol, preferably 10 000 g/mol to 250 000 g/mol, more preferably 15 000 to 100 000 g/mol, and very preferably 20 000 to 75 000 g/mol.

The method of the invention is carried out using an acidic, aqueous preparation (a) of the copolymers (A).

As solvent the preparation (a) preferably comprises just water. Besides water, it may also comprise water-miscible organic solvents. Examples include monoalcohols such as methanol, ethanol or propanol, higher alcohols such as ethylene glycol and polyether polyols, and ether alcohols such as butylglycol or methoxypropanol. As a general rule, however, the amount of water is at least 80% by weight, preferably at least 90% by weight, and very preferably at least 95% by weight. These figures are based in each case on the total amount of all solvents.

With advantage it is possible to make direct use of the polymer-containing solutions which result from the polymerization and which optionally are diluted further still. In order to facilitate such direct further use, the amount of the aqueous solvent used for the polymerization ought from the start to be such that the concentration of the copolymer (A) in the solvent is suitable for the application.

The concentration of the copolymers (A) in the preparation (a) is determined by the skilled person in accordance with the desired end application. The thickness of the passivating layer is dependent, for example, on the chosen process technology, but may also depend on the viscosity of the composition that is used for passivating. Generally speaking, a concentration which has been found appropriate is that from 0.01 g/l to 500 g/l, preferably 0.1 g/l to 200 g/l, and more preferably 1 g/l to 100 g/l. The stated concentrations are based on the preparation in ready-to-use form. Generally it is possible first to prepare a concentrate, which only in situ is diluted with water or, optionally, other solvent mixtures to the desired concentration.

The preparation (a) used in accordance with the invention is acidic. It generally has a pH of 0.5 to 6, with the choice of narrower pH ranges being possible depending on the substrate and the mode of application and also on the time over which the surface is exposed to the preparation. For example, the pH is adjusted preferably to the range from 2 to 4 for treating aluminum surfaces, and to the range from 0.5 to 5 when treating zinc or galvanized steel.

The pH of the preparation (a) may be controlled on the one hand through the type and concentration of the acid groups in the polymers or copolymers, and hence comes about automatically. In this context it should be borne in mind that as a result of preparation the acid groups in the polymer may under certain circumstances have been fully or partly neutralized.

As an alternative option, the preparation (a) may further comprise at least one inorganic or organic acid or mixtures thereof. Examples of suitable acids include phosphorus-, sulfur- or nitrogen-containing acids such as phosphoric acid, phosphonic acid, sulfuric acid, sulfonic acids such as methanesulfonic acid, amidosulfonic acid, p-toluenesulfonic acid, m-nitrobenzenesulfonic acid, nitric acid, hydrochloric acid, formic acid, oxalic acid, lactic acid or acetic acid, and also derivatives thereof and/or corresponding alkali metal, alkaline earth metal, transition metal (especially Zn, Zr, Ti) or ammonium salts. The acid is preferably selected from the group consisting of $HNO_3$, $H_2SO_4$, $H_3PO_4$, formic acid, acetic acid, oxalic acid or lactic acid. Particularly preferred are $H_3PO_4$ and/or $HNO_3$. Especially preferred are $H_3PO_4$ and its salts. It is of course also possible to use mixtures of different acids.

Examples of phosphonic acids include 1-hydroxyethane-1,1-diphosphonic acid (HEDP), 2-phosphonobutane-1,2,4-tricarboxylic acid (PBTC), (2,4,4-trimethylpentyl)phosphonic acid, bis(2,4,4-trimethylpentyl)phosphinic acid, aminotri(methylenephosphonic acid) (ATMP), ethylenediaminetetra(methylene-phosphonic acid) (EDTMP) or diethylenetriaminepenta(methylenephosphonic acid) (DTPMP).

The type and concentration of the acid in the preparation (a) is determined by the skilled person in accordance with the desired application and pH. In general a concentration which has been found appropriate is that from 0.01 g/l to 30 g/l, preferably 0.05 g/l to 20 g/l, and more preferably 0.1 g/l to 10 g/l.

Beyond the stated components, the preparation (a) may optionally comprise further components.

The components present optionally may be, for example, transition metal ions and their compounds, examples being those of Ce, Ni, Co, V, Fe, Zn, Zr, Mn, Mo, W, Ti, Zr, Hf, Bi, and/or of the lanthanides. They may also be compounds of main-group elements, such as, for example, Si and/or Al, Ca, Mg. The compounds may be used in, for example, the form of salts or of the respective aqua complexes. Alternatively they may be complexes with other ligands, such as, for example, oxometallates such as, for example, $MoO_4^{2-}$ or $WO_4^{2-}$, lactates or oxalates. It is also possible, furthermore, to use complexes with typical chelate-forming ligands such as ethylenediaminetetraacetic acid (EDTA), diethylenetriaminepentaacetic acid (DTPA), hydroxyethylethylene-diaminetriacetic acid (HEDTA), nitrilotriacetic acid (NTA) or methylglycinediacetic acid (MGDA).

Further optional components include surface-active compounds, corrosion inhibitors or typical electroplating auxiliaries. The skilled person makes an appropriate selection from among the optional components that are possible in principle, and of their amounts as well, in accordance with the desired application. Examples of particularly preferred corrosion inhibitors which can be used in combination with the copolymers (A) include benzotriazole and/or tolyltriazole.

The passivation in question is preferably a substantially chromium-free passivation. This is intended to mean that small amounts, at most, of chromium compounds could be added in order to fine-tune the properties of the passivating layer. The amount should not exceed 2%, preferably 1%, and more preferably 0.5%, by weight, of chromium, relative to all of the constituents of the composition. If chromium compounds are to be used, then it is preferably Cr(III) compounds that are used. The Cr(VI) content, however, should in every case be kept to such a low level that the Cr(VI) content on the passivated metal does not exceed 1 $mg/m^2$.

With particular preference, the passivation is a chromium-free passivation; in other words, the preparation (a) employed contains no Cr compounds at all. The expression "chromium-free", however, does not rule out the entrainment, indirectly and without inherent intention, of small amounts of chromium into the method. Indeed, if the method of the invention is used to passivate alloys which include chromium as an alloying constituent, such as Cr-containing steel, for example, it is always within the bounds of possibility that small amounts of chromium in the metal to be treated may be dissolved by the preparation used for the method and may, accordingly, pass unintentionally into the preparation. Even in the case where such metals are used, with the resulting consequences, the method should still be regarded as "chromium-free". With particular preference, the passivation is also fluorine-free.

The water-soluble and/or water-dispersible species (B) which are used in accordance with the invention and contain cationic and/or procationic groups are cationic and/or procationic polymers or macromolecules (e.g., linear and/or branched homopolymers and/or copolymers, biomacromolecules, etc.), cationic and/or procationic polymeric colloids, cationic and/or procationic metal colloids and metal nanoparticles, optionally with only cationic and/or procationic ligands, cationic and/or procationic metal and/or semimetal oxide colloids and nanoparticles, optionally with only cationic and/or procationic ligands, and also cationic and/or procationic small molecules, such as tetraaminocyclohexane derivatives and their protonated forms, porphyrins and their protonated form, for example.

The cationic and/or procationic species (B) ought preferably not to be toxic.

The species (B) are preferably water-soluble cationic and/or procationic polymers (B1).

A cationic and/or procationic polymer (B1) is a polymer comprising structural units having at least one cationic or procationic group, which may be an integral part of the main polymer chain or may be suspended laterally from said chain. However, it need not necessarily be present in every repeating unit of the polymer.

Procationic groups are those which are capable of accommodating protons, by means, for example, of reaction with acids to form salts. The cationic and procationic groups of the species (B) are preferably nitrogen or sulfur, more preferably groups containing nitrogen. Typical cationic, nitrogen-containing groups are quaternary ammonium salts, diazonium salts, and the salts of tertiary, secondary and/or primary amines. Typical procationic groups are, for example, tertiary, secondary and/or primary amines.

From among the large number of cationic and/or procationic polymers (B1) which are suitable in accordance with the invention and comprise structural units having quaternary ammonium salt groups, preferred compounds include polyallylalkylammonium salts such as poly(diallyldimethylammonium chloride), Lugalvan® P, polymers with vinyl structural units and quaternized heteroaromatics such as imidazole, pyrazole, triazole, pyridine, etc. in the side chain, such as poly(2-vinyl-1-methylpyridinium bromide), for example, and also polymers with a trialkylammonium salt structure in the side chain such as poly(2-methacryloyloxyethyltrimethylammonium bromide).

From among the large number of cationic and/or procationic polymers (B1) that are suitable in accordance with the invention and comprise structural units with tertiary amines and salts thereof, preferred compounds include poly(diallylmethylamine hydrochloride) and polymers with vinyl structural units and nitrogen-containing heteroaromatics such as imidazole, pyrazole, triazole, pyridine, etc. in the side chain, such as, for example, poly(4-vinylpyridine) and also the protonated form thereof.

From among the large number of suitable cationic and/or procationic polymers (B1) comprising structural units with secondary amines and salts thereof, a preferred compound is linear and/or branched polyethyleneimine, and also its protonated form.

From among the large number of suitable cationic and/or procationic polymers (B1) comprising structural units with primary amines and salts thereof, preferred compounds are polyvinylamine, polyallylamine hydrochloride, polylysine, and polylysine hydrochloride.

The salts exemplified above are not confined to the cited counterions—in other words, chloride and bromide are interchangeable (with one another as well) and may be replaced by other customary acid anions such as, for example, phosphate, hydrogenphosphate, acetate, hydrogensulfate, etc.

Cationic and/or procationic polymers (B1) comprising structural units with quaternary ammonium salt groups are preferred. Particularly preferred is Lugalvan® P, a commercial product from BASF.

Additionally suitable as cationic and/or procationic polymers (B1) are polymers which comprise structural units having positively charged sulfur groups, based for example on sulfur-containing heteroaromatics such as, for example, oxidized poly(3,4-ethylenedioxythiophene), also known as PEDOT. The cationic and/or procationic polymer (B1) may also be a copolymer comprising various of the aforementioned repeating units. Additionally suitable as cationic and/or procationic polymers (B1) are copolymers which as well as the aforementioned structural units of cationic and/or procationic monomers comprise structural units, different therefrom, of other monomers (c). These monomers (c), however, must not alter the above-defined character of the cationic and/or procationic polymers (B1). From among a large number of suitable comonomers (c), mention may be made of styrene and/or vinyl alcohol as examples. Examples of corresponding copolymers of the cationic and/or procationic polymer (B1) are copolymers based on allylamine hydrochloride and styrene and/or vinyl alcohol, and copolymers based on diallyldimethylammonium chloride and styrene and/or vinyl alcohol, without being confined to these copolymers.

The fraction of the comonomers (c) in the cationic and/or procationic polymer (B1) may be 0% to 50% by weight.

The cationic and/or procationic polymers (B1) used in accordance with the invention may be obtained by customary methods known to the skilled person, such as by radical polymerization or by polycondensation. The skilled person selects the appropriate method as a function of the chemical constitution of the monomer.

The molecular weight $M_w$ (weight average) of the cationic and/or procationic polymer (B1) used for the method of the invention is specified by the skilled person in accordance with the desired application. Generally speaking, $M_w$ is 5000 to 2 000 000 g/mol.

As solvent, the preparation (b) with the cationic and/or procationic species (B) preferably comprises just water. In addition, it may comprise water-miscible organic solvents. Examples include monoalcohols such as methanol, ethanol or propanol, higher alcohols such as ethylene glycol or polyether polyols, and ether alcohols such as butylglycol or methoxypropanol. As a general rule, however, the amount of water is at least 80% by weight, preferably at least 90% by weight, and very preferably at least 95% by weight. These figures are based in each case on the total amount of all solvents.

Dispersions of the cationic and/or procationic species (B) in the form of colloids, for example, in the solvents stated above are likewise included in the term "solution".

With advantage it is possible to make direct use of the solutions with the cationic and/or procationic species (B), preferably with the cationic and/or procationic polymer (B1), which result from the synthesis (e.g., polymerization), which optionally are diluted still further. In order to facilitate such direct further use, the amount of the aqueous solvent used for the synthesis ought from the start to be such that the concentration of the cationic and/or procationic species (B) in the solvent is suitable for the application.

The concentration of the cationic and/or procationic species (B) in the preparation (b) is determined by the skilled person in accordance with the desired application. For example, the thickness of the passivating layer is dependent on the chosen process technology, but may also depend on the viscosity of the composition that is used for passivating. Generally speaking, a concentration which has been found appropriate is that from 0.01 g/l to 500 g/l, preferably 0.1 g/l to 200 g/l, and more preferably 1 g/l to 100 g/l. The stated concentrations are based on the preparation in ready-to-use form. Generally it is possible first to prepare a concentrate, which is diluted only in situ with water or, optionally, other solvent mixtures to the desired concentration.

The preparation (b) used in accordance with the invention generally has a pH of 1 to 12, with the choice of narrower pH ranges being possible depending on the substrate and mode of application and also on the time during which the surface is exposed to the preparation. The pH of the preparation (b) may be controlled on the one hand through the type and number of (pro)cationic groups in the species (B), and hence comes about automatically.

Furthermore, the pH of the aqueous preparation (b) may be adjusted by addition of acids or bases. The addition of acids is advantageous particularly in the case of weak polybases such as, for example, in the case of polyethyleneimine.

The preparation (b) may therefore optionally further comprise at least one inorganic or organic acid or mixtures thereof, and also derivatives or salts thereof, or at least one base or mixtures thereof and also derivatives or salts thereof. Suitable and preferred acids are likewise those specified in this connection for the preparation (a).

Examples of suitable bases are generally alkali metal hydroxides or alkaline earth metal hydroxides, amines or ammonia.

The type and concentration of the acid or base in the preparation (b) is determined by the skilled person in accordance with the desired application and pH.

Beyond the stated components, the preparation (b) may also, optionally, comprise further components. These include surface-active compounds, corrosion inhibitors or typical electroplating auxiliaries. The skilled person makes an appropriate selection from among the optional components that are possible in principle, and their amounts as well, in accordance with the desired application.

The metallic surfaces which can be passivated by means of the method of the invention are more particularly the surfaces of base metals. The surface in question may be that, for example, of iron, steel, Zn, Zn alloys, Al or Al alloys, Mg or Mg alloys. The steels may be either low-alloy or high-alloy steels.

The method of the invention is suitable especially for passivating metallic surfaces of Zn, Zn alloys, Al or Al alloys. The surfaces in question may be those of structures or workpieces composed entirely of said metals and/or alloys. Alternatively they may be surfaces of structures coated with Zn, Zn alloys, Al or Al alloys, it being possible for the structures to be composed of other materials, such as of other metals, alloys, polymers or composites, for example. The surface in question may more particularly be that of zinc-coated iron or steel. The term "zinc-coated" of course also encompasses coating with a zinc alloy.

Zn alloys or Al alloys are known to the skilled person. The skilled person selects the type and amount of alloying constituents in accordance with the desired application. Typical constituents of zinc alloys include, in particular, Al, Mg, Pb, Si, Mg, Sn, Cu or Cd. The materials in question may also be Zn/Mg alloys or Al/Zn alloys, in which Zn and Mg, or Al and Zn, respectively, are present in approximately equal amounts. The coatings may be largely homogeneous coatings or else coatings which exhibit concentration gradients. For example, the material may be a galvanized steel which has been additionally treated by vapor deposition with Mg. On the surface, this may produce a Zn/Mg alloy. Typical constituents of aluminum alloys include, in particular, Mg, Mn, Si, Zn, Cr, Zr, Cu or Ti. The metallic surfaces to be treated may of course also have thin oxidic/hydroxidic and/or caronatic surface layers or layers of similar construction. Such layers typically form automatically on metallic surfaces in contact with the atmosphere, and are included in the term "metallic surface". The "metallic surface" may be the surface of piece goods (drum product, rack product, etc.) or the surface of strip metals.

In one preferred embodiment of the method, the surface in question is that of a strip metal, preferably made of aluminum or of aluminum alloys, or of iron and/or steel; more particularly, of strips of electrogalvanized or hot-dip-galvanized steel.

In the method of the invention for passivating metallic surfaces, the surface of the metal is treated alternately with the acidic aqueous preparation (a) and with the aqueous preparation (b), the preparation (a) always being applied as the first and the last layer. The procedure may be repeated until a passivating layer having the desired thickness has formed on the metallic surface.

The preparations (a) and (b) used in the method of the invention may be applied, for example, by spraying, dipping or rolling. After a dipping operation, excess treatment solution can be removed from the workpiece by allowing it to drip dry; in the case of metal panels, metal foils or the like, excess treatment solution may alternatively be removed by squeezing off or squeegeeing, for example.

In the course of treatment with the preparation (a), parts at least of the copolymers (A) used are chemisorbed by the surface of the metal, producing a firm bond between surface and the components.

Treatment with the preparation (a) or (b) takes place typically at room temperature or temperatures above room temperature, although this is not intended to rule out the possibility of lower temperatures in principle. In general, the treatment takes place at 20 to 90° C., preferably 20 to 60° C. For this purpose, the bath with the preparation (a) or (b) may be heated, but an elevated temperature may also come about automatically, by the immersion of hot metal into the bath. Treatment with the preparation (a) or (b) at room temperature is especially preferred.

It is possible to rinse the surface, after treatment, with a cleaning liquid, in particular with water, in order to remove residues of the preparation (a) or (b) used in accordance with the invention from the surface.

The treatment may alternatively be what is called a "no-rinse" operation, in which the treatment solution is dried directly in a drying oven immediately following its application, without rinsing.

The treatment of the metal surface with the preparation (a) or (b) may take place discontinuously or, preferably, continuously. A continuous process is suitable particularly for treating strip metals. The metal strip is in this case run through a trough or a spraying apparatus with the preparation (a), and also a trough or spraying apparatus with the preparation (b), and also, optionally, through further pretreatment or aftertreatment stations, or the preparation (a) and/or (b) is applied to the metal strip by rolling, using a coater.

The treatment time is specified by the skilled person in accordance with the desired properties of the layer, the composition used for the treatment, and the technical boundary conditions. The time may be considerably less than one second or may be a number of minutes. In the case of the continuous process, it has proven particularly appropriate to contact the surface with the preparation for a time of 1 to 60 seconds.

Following the treatment, the solvent used is removed. It may be removed at room temperature by simple evaporation in air at room temperature.

Alternatively the removal of the solvent may be assisted by suitable auxiliary means, as for example by heating and/or by the passing of streams of gas, particularly streams of air, over the treated surface. The evaporation of the solvent may be assisted, for example, by radiant IR heaters, or else, for example, by drying in a drying tunnel. For the purpose of drying, a temperature which has been found appropriate is that from 30° C. to 180° C., preferably 40° C. to 100° C., and more preferably 40° C. to 80° C. The temperature referred to here is the temperature on the metal surface (peak metal temperature (PMT)); it may be necessary to set the dryer temperature at a higher level, which is selected appropriately by the skilled person. Drying at the stated elevated temperatures takes place preferably after each of the applied layers, but alternatively may take place after the application of the complete multicoat.

The aforesaid method steps take place first of all with the preparation (a) and are optionally repeated multiply in alternation with the preparation (b), before then finishing with the preparation (a).

The method of the invention may optionally comprise one or more pretreatment steps. For example, prior to passivation, the metallic surface may be cleaned, in order to remove greases or oils, for example. Moreover, the surface may also be pickled prior to passivation, in order to remove oxide deposits, scale, temporary corrosion protection, and the like. Furthermore, the surface may also need to be rinsed with water after and between such pretreatment steps, in order to remove the residues of rinsing solutions or pickling solutions.

The passivating layer may additionally be crosslinked. For this purpose it is possible, for example, to mix a crosslinker into the preparation (a) and/or (b) used, with the proviso that said crosslinker does not react while still in the respective preparation. An alternative is first to treat the metal with the preparation (a) and/or (b), and thereafter to treat the respective layer with a suitable crosslinker—for example, to spray it with the solution of a crosslinker.

Suitable crosslinkers ought to be water-soluble or at least soluble in the stated aqueous solvent mixture. Examples of suitable crosslinkers include in particular those which have at least 2 crosslinking groups selected from the group consisting of azirane, oxirane, and thiirane groups. Further details of suitable crosslinkers are disclosed in publication WO 2005/042801 A1, hereby incorporated by reference.

By means of the method of the invention it is possible to obtain a passivating layer on a metallic surface, which is likewise provided by the invention. The precise structure and composition of the passivating layer is unknown. However, besides the customary amorphous oxides of aluminum or of zinc and also, optionally, of further metals, it additionally comprise the reaction products of the copolymer (A), and also, optionally, of the crosslinker and/or of further components of the preparation (a), and the reaction products of the cationic and/or procationic species (B) and also, optionally, of further components of the preparation (b).

The passivating layer obtainable by the method of the invention is a multicoat and has 3+2n (n=0, 1, 2, 3 etc.) alternating layers on the metallic surface. The layer sequence is (a), (b), n times ((a), (b)), and lastly (a).

Preferred in accordance with the invention are metallic surfaces having a passivating layer made up of 3 to 7 layers in accordance with the sequence described above; particularly preferred metallic surfaces are those with a passivating layer made up of 3 layers with the sequence (a), (b), (a).

The thickness of the passivating layer is set by the skilled person in accordance with the desired properties of the layer. In general the thickness is 0.01 to 3 µm, preferably 0.02 to 1 µm, and more preferably 0.03 to 0.2 µm. The thickness can be influenced by way, for example, of the nature and amount of the components applied, by the number of repetitions of the application procedure, and by the exposure time. Furthermore, it is possible to use technical parameters of the method to influence the thickness—for example, by using rollers or squeegees to remove treatment solution applied in excess.

The thickness of the layer is determined by differential weighing before and after exposure of the metal surface to the composition used in accordance with the invention, on the assumption that the layer has a specific density of 1 kg/l. In the text below, "layer thickness" always refers to a variable determined in this way, irrespective of the actual specific density of the layer.

The present invention additionally provides a metallic surface comprising the passivating layer of the invention. The passivating layer is applied directly on the actual metal surface. In one preferred embodiment the surface in question is that of a strip metal made of steel, comprising a coating of Zn or of a Zn alloy, on which a passivating layer of the invention is applied.

The metallic surface with the passivating layer of the invention may be recoated in a manner known in principle with one or more coating layers (primer, topcoat). Typical coating materials, their composition, and typical layer sequences in the case of two or more coating layers, are known in principle to the skilled person.

The passivating layer of the invention may also be employed for temporary passivation, which is subsequently further passivated or phosphated by other methods.

The method of the invention is especially suitable for the pretreatment of strip metals in the area of pretreatment/coil-coating. Preferred accordingly are passivating layers obtainable by the method of the invention that are employed as a pretreatment layer on strip metals.

EXAMPLES

Preparation Instructions for an Inventively Employed Copolymer (A)

A 6 l reactor vessel equipped with anchor stirrer, temperature control, nitrogen inlet, and 2 feed ports is initially charged with 85.3 g of vinylphosphonic acid (95% form), 292.7 g of itaconic acid, and 531.3 g of deionized water. The initial charge is gassed with nitrogen for 15 minutes and heated to 98° C. under a nitrogen atmosphere. Subsequently, 324.3 g of acrylic acid in 324.3 g of deionized water are added over the course of 5 hours, and 41.9 g of sodium peroxodisulfate in 250 g of deionized water over the course of 6 hours. This is followed by stirring at 98° C. for 2 hours more. The product is a pale yellow, clear polymer solution having a solids content of 40.2% and a K value of 23.2 (at 1% strength in deionized water).

Analysis of the Inventive Products:

The K values were measured by the method of H. Fikentscher, Cellulose-Chemie, vol. 13, pp. 58-64 and 71-74 (1932) in 1% strength by weight aqueous solution at 25° C.

Inventive Example 1

Preparations for the Inventive Method

Preparation (a): 1% by weight (based on solids) of copolymer (A) from example 1
Preparation (b): 1% by weight of Lugalvan P (a commercially available product from BASF) in water Comparative Example 1

Preparation (c): 10% by weight (based on solids) of copolymer (A) in water
Metal-Panel Coating:
Steel panels used:
Test panels made of hot-dip-galvanized steel were used (Gardobond OE HDG 3 from Chemetall).

Cleaning (Step 1):

The panels were first degreased with ethanol and ethyl acetate and then immersed into an alkaline cleaning solution (e.g., Ridoline C72, from Henkel, 4.3 g/l at 60° C. for 1 minute), immediately rinsed with deionized water, and then dried using nitrogen.

Application of the Pretreatment Layer (Step 2):

Inventive Example 1

The cleaned panels were immersed in preparation (a) at room temperature for 2-3 seconds and squeezed off using a system of rollers. These operations were repeated with preparation (b) and then again with preparation (a).

Comparative Example 1

The cleaned panels were immersed in preparation (c) at room temperature for 2-3 seconds and squeezed off using a system of rolls.

Subsequently the panels were dried in a drying oven at 160° C. for 15-20 seconds. In the course of this drying, the peak metal temperature did not exceed 50° C. In each case, 2 panels were coated.

Application of Primer and Topcoat (Step 3):

The panels with pretreatment layer, and also a commercially available panel pretreated with Gardo TP10475 (from Chemetall, Cr-free, F-containing), which is used as a reference panel, were coated using a wire doctor with the respective primer (see table 1) and baked according to manufacturer specifications in an oven, before briefly being immersed into deionized water and then dried using compressed air. The respective topcoat (see table 1) was subsequently applied likewise in accordance with manufacturer specifications, using a wire doctor, and the panels were baked in an oven, then briefly immersed into deionized water and dried vertically.

Tests:

Salt Spray Test

The result of a salt spray test in accordance with DIN 50021 is used as a measure of the corrosion inhibition effect. The salt spray test was carried out with the fully coated panels (steps 1-3), using a well-defined, vertical, central scribe mark (through the coating layers and through the Zn coating) which was 0.3 mm wide and 11 cm long; the storage time was 6 weeks. The results of the tests are compiled in table 1.

The sub-film corrosion migration is the average half-side spread of the original scribe mark. The average value was formed for the panels investigated.

T-Bend Test:

The T-bend test was carried out in accordance with DIN EN ISO 1519:2003 with the fully coated panels (steps 1-3). The test result is compiled in table 1 and indicates the minimum distances possible between the two sides of the bent panel without delamination phenomena occurring. The values are listed in relative units, standardized for the panels with the commercially available Gardo TP10475 pretreatment from Chemetall. The average value was formed for the panels investigated.

Tape Delamination Test:

The tape test was carried out in accordance with DIN EN ISO 1519:2003 with the fully coated panels (steps 1-3). The test result is compiled in table 1 and indicates the minimum distances possible between the two sides of the bent panel without tape delamination phenomena occurring at the bent edge. The values are listed in relative units, standardized for the panels with the commercially available Gardo TP10475 pretreatment from Chemetall. The average value was formed for the panels investigated.

Summary: the results (tab. 1) show that with the inventive method on metallic surfaces, in comparison to the prior art, an improved corrosion protection can be achieved, with likewise improved or comparable mechanical delamination behavior (T-bend test, tape test).

TABLE 1

Results of the tests on the coated panels

| Pretreatment | Primer | Topcoat | Sub-film corrosion migration [mm] | T-blend test [rel. units] | Tape test [rel. units] of |
|---|---|---|---|---|---|
| Inventive example 1 | Coiltec ® Universal P CF (BASF) | Polyceram ® Plus P, white (BASF) | 0.2 | 95 | 40 |
| Comparative example 1 | Coiltec ® Universal P CF (BASF) | Polyceram ® Plus P, white (BASF) | 4.3 | 95 | 60 |
| Gardo TP 10475 (Chemetall), fluorine-containing | Coiltec ® Universal P CF (BASF) | Polyceram ® Plus P, white (BASF) | 0.8 | 100 | 100 |
| Inventive example 1 | Coiltec ® Top P CF Universal (BASF) | Polyceram ® Plus P, white (BASF) | 0.05 | 100 | 80 |
| Comparative example 1 | Coiltec ® Top P CF Universal (BASF) | Polyceram ® Plus P, white (BASF) | 0.1 | 100 | 80 |
| Gardo TP 10475 (Chemetall), fluorine-containing | Coiltec ® Top P CF Universal (BASF) | Polyceram ® Plus P, white (BASF) | 0.3 | 100 | 100 |

The invention claimed is:

1. A method for passivating a metallic surface, which comprises treating the surface in alternating layers with a) then with b), a) always being the first and last layer, such that a multicoat passivating layer is provided on said metallic surface, said multicoat passivating layer comprising 3n+2 alternating layers where n is an integer and the layer sequence is a), b), n times {a), b)} and lastly a), where a) and b) are:
   a) an acidic, aqueous preparation comprising at least one water-soluble copolymer (A) synthesized from
      (a1) 15% to 99.9% by weight of (meth)acrylic acid or a salt thereof and
      (a2) 0.1% to 85% by weight of at least one further monoethylenically unsaturated monomer, which is different from (a1) and which comprises acidic groups, and also, optionally,
      (a3) 0% to 55% by weight of at least one further ethylenically unsaturated monomer, which is different from (a1) and (a2);
   b) an aqueous preparation comprising at least one water-soluble and/or water-dispersible species (B) which comprises cationic and/or procationic groups.

2. The method according to claim 1, wherein the metallic surface is the surface of a strip metal.

3. The method according to claim 2, wherein the strip metal comprises electrogalvanized or hot-dip-galvanized steel.

4. The method according to claim 1, wherein the monomer (a2) in the copolymer (A) is synthesized from at least one monoethylenically unsaturated dicarboxylic acid having 4 to 7 carbon atoms (a21) and/or at least one monoethylenically unsaturated phosphoric and/or phosphonic acid (a22).

5. The method according to claim 4, wherein the monomer (a21) is selected from the group containing maleic acid, fumaric acid, methylfumaric acid, methylmaleic acid, dimethylmaleic acid, methylenemalonic acid, and itaconic acid.

6. The method according to claim 1, wherein the copolymer (A) is a copolymer synthesized from monomer units of acrylic acid (a1) and itaconic acid (a21), or a terpolymer synthesized from monomer units of acrylic acid (a1), itaconic acid (a21), and vinylphosphonic acid (a22).

7. The method according to claim 1, wherein the species (B) is a cationic and/or procationic polymer (B1).

8. The method according to claim 7, wherein the cationic and/or procationic polymer (B1) comprises structural units having at least one cationic or procationic, nitrogen-containing group.

9. The method according to claim 8, wherein the cationic, nitrogen-containing group of the polymer (B1) is a quaternary ammonium salt.

10. The method according to claim 1, wherein said method is a chromium-free method.

11. The method according to claim 1, wherein the treatment is performed by a continuous process.

12. A passivating layer on a metallic surface, obtained by the method according to claim 1.

13. The method according to claim 1, wherein said method is free of heavy metals and is fluorine-free, and wherein said metallic surface is a surface of Zn, Zn alloy, Al or Al alloy.

14. The method according to claim 13, wherein the metallic surface is the surface of a strip metal.

* * * * *